(12) United States Patent
Bisht et al.

(10) Patent No.: US 12,445,535 B2
(45) Date of Patent: Oct. 14, 2025

(54) INTER-APPLICATION NETWORKING PROFILES FOR ELECTRONIC DEVICES

(71) Applicant: Apple Inc., Cupertino, CA (US)

(72) Inventors: Abhishek Bisht, Fremont, CA (US); Kristian D. Pereira, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/497,966

(22) Filed: Oct. 30, 2023

(65) Prior Publication Data

US 2024/0406288 A1  Dec. 5, 2024

Related U.S. Application Data

(60) Provisional application No. 63/470,954, filed on Jun. 4, 2023.

(51) Int. Cl.
| | |
|---|---|
| *H04L 12/08* | (2006.01) |
| *H04L 12/26* | (2006.01) |
| *H04L 43/045* | (2022.01) |
| *H04L 67/60* | (2022.01) |
| *H04L 67/75* | (2022.01) |
| *H04W 24/08* | (2009.01) |
| *H04W 28/02* | (2009.01) |

(52) U.S. Cl.
CPC ............ *H04L 67/60* (2022.05); *H04L 43/045* (2013.01); *H04L 67/75* (2022.05)

(58) Field of Classification Search
CPC ....... H04L 67/60; H04L 67/75; H04L 43/045; H04L 12/21; H04L 12/26; H04L 43/08; H04W 24/08; H04W 28/02

USPC ......................................................... 709/217
See application file for complete search history.

(56) References Cited

U.S. PATENT DOCUMENTS

| | | | |
|---|---|---|---|
| 10,587,987 B2 | 3/2020 | Thoresen et al. | |
| 11,380,097 B2 | 7/2022 | Bai et al. | |
| 11,601,993 B2 | 3/2023 | Foster et al. | |
| 2005/0038883 A1* | 2/2005 | Elko | H04L 41/044 |
| | | | 709/223 |
| 2012/0162265 A1* | 6/2012 | Heinrich | G06F 3/04883 |
| | | | 345/173 |
| 2014/0157142 A1* | 6/2014 | Heinrich | G06F 3/0412 |
| | | | 715/744 |
| 2017/0251388 A1* | 8/2017 | Persson | H04W 24/10 |
| 2021/0349747 A1* | 11/2021 | Albasheir | G06F 11/302 |
| 2022/0353181 A1* | 11/2022 | Vasseur | H04L 45/306 |
| 2023/0254210 A1* | 8/2023 | Mangalam | H04L 67/34 |
| | | | 709/220 |

\* cited by examiner

*Primary Examiner* — Jude Jean Gilles
(74) *Attorney, Agent, or Firm* — BAKERHOSTETLER

(57) ABSTRACT

Implementations of the subject technology provide systems and methods for providing inter-application network profiles for electronic devices. An inter-application network profile may include, for example, a network profile generated by one application and provided to another application. The other application can then initiate its network communications at a data rate that is determined based on the network profile received from the one application. In one or more implementations, a first application can generate a three-dimensional network profile map of a three-dimensional physical space.

20 Claims, 9 Drawing Sheets

INTER-APPLICATION NETWORKING PROFILES FOR ELECTRONIC DEVICES

CROSS REFERENCE TO RELATED APPLICATIONS

This application claims the benefit of priority to U.S. Provisional Patent Application No. 63/470,954, entitled, "INTER-APPLICATION NETWORKING PROFILES FOR ELECTRONIC DEVICES", filed on Jun. 4, 2023, the disclosure of which is hereby incorporated herein in its entirety.

TECHNICAL FIELD

The present description relates generally to electronic devices, including, for example, to inter-application networking profiles for electronic devices.

BACKGROUND

Electronic devices often include applications that perform various functions that utilize network communications capabilities of the electronic devices.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
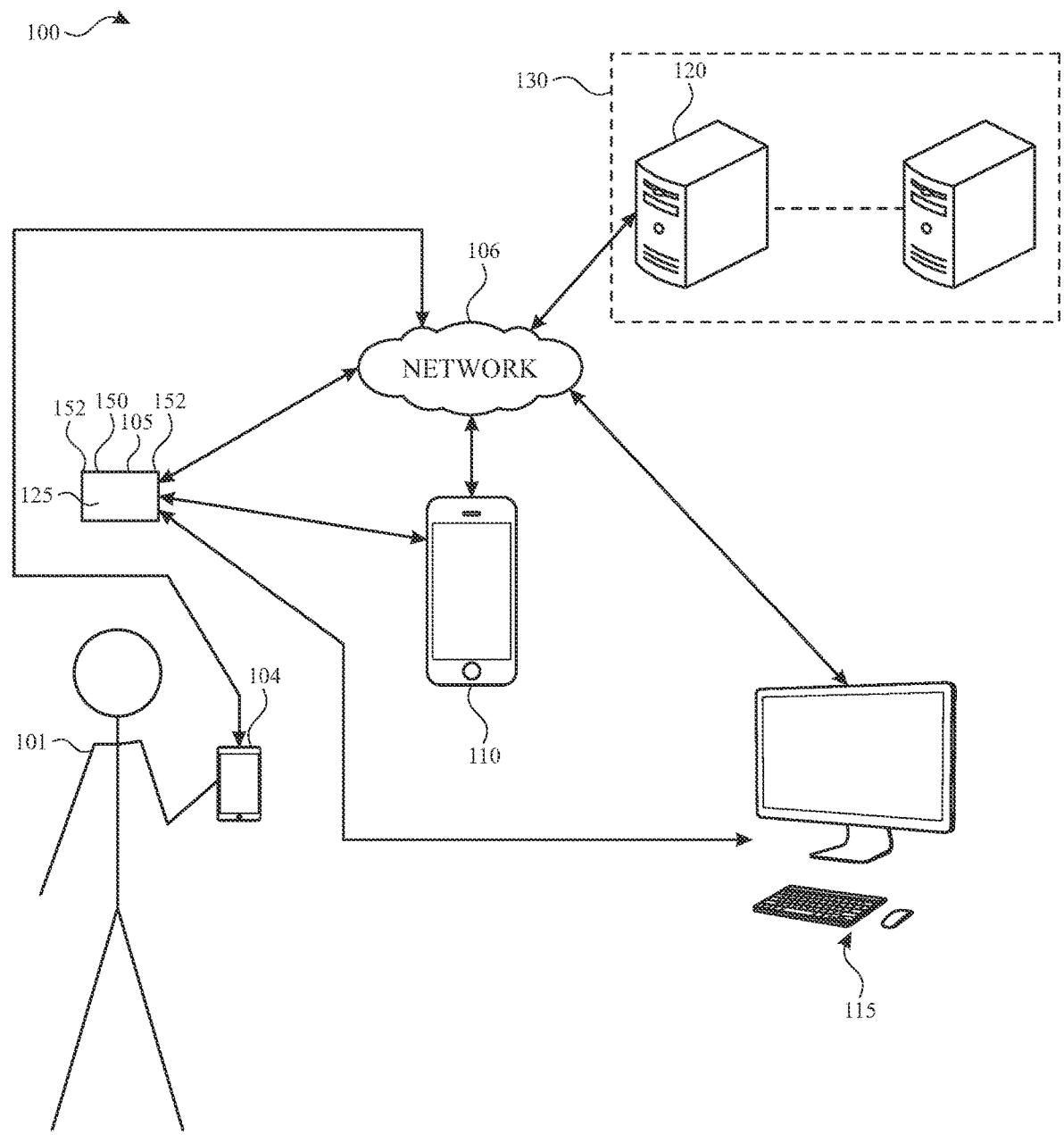
FIG. 1 illustrates an example system architecture including various electronic devices that may implement the subject technology in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein may provide proactive data rate management for applications. In one or more implementations, an application that determines a network profile (e.g., including a wireless signal strength, a maximum transmit rate, a maximum receive rate, forward error correction (FEC) rate, wireless band, and/or other network quality information) for a current location of an electronic device, and/or at a current time, can pass some or all of that network profile to another application at the electronic device. The other application can then initiate its network communications at a data rate (e.g., a bit rate or a frames per second, or fps, rate) that is based on the network profile information received from the application (e.g., in contrast with the other application performing redundant processing and communications to determine its own network profile). This can be particularly useful, for example, for devices on which multiple applications can concurrently utilize network communications, and/or for devices on which multiple applications can variously switch between inactive and active states. In one or more implementations, an application can generate a three-dimensional map of the wireless environment, and can guide a user to a better location for a current or higher-performance operational mode of the application. In one or more implementations, an application can maintain an average, median, or other tracking statistic for a signal metric (e.g., one or more of a wireless signal strength, a packet loss rate, a maximum transmit rate, a maximum receive rate, and/or other signal metric) based on a time of day and/or a day of the week. The application may provide another application and/or a user with a suggested time for use of a current or higher-performance operational mode of the application (e.g., a time of day or a day of the week) when an improved signal is expected to be available based on the average, median, or other tracking statistic.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smartphone, a tablet device, or a wearable device such as a head mountable portable system, that includes a display system capable of presenting a visualization of an extended reality environment or other display environment to a user (e.g., user 101). The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use an electronic device 104, such as a tablet, watch, mobile device, and the like.

The electronic device 105 may include one or more cameras such as camera(s) 150 (e.g., visible light cameras, infrared cameras, eye tracking cameras, etc.) Further, the electronic device 105 may include various sensors such as sensor(s) 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but not limited to, facial tracking, eye tracking (e.g., gaze direction or gaze location tracking), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 and/or providing power to the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to coordinate the rendering of virtual content, such as a UI of an application, for display within the XR environment.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may be, for example, a smartphone, a portable computing device such as a laptop computer, a peripheral device (e.g., a digital camera, headphones), a tablet device, a wearable device such as a watch, a band, and the like, any other appropriate device that includes, for example, communications circuitry for communicating with other electronic devices via a wired or wireless connection. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device. In one or more implementations, the electronic device 110, the electronic device 104, and/or the electronic device 105 may be, and/or may include all or part of, the electronic system discussed below with respect to FIG. 8. In one or more implementations, the electronic device 110 may be another device such as an Internet Protocol (IP) camera, a tablet, or a peripheral device such as an electronic stylus, etc.

The electronic device 115 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
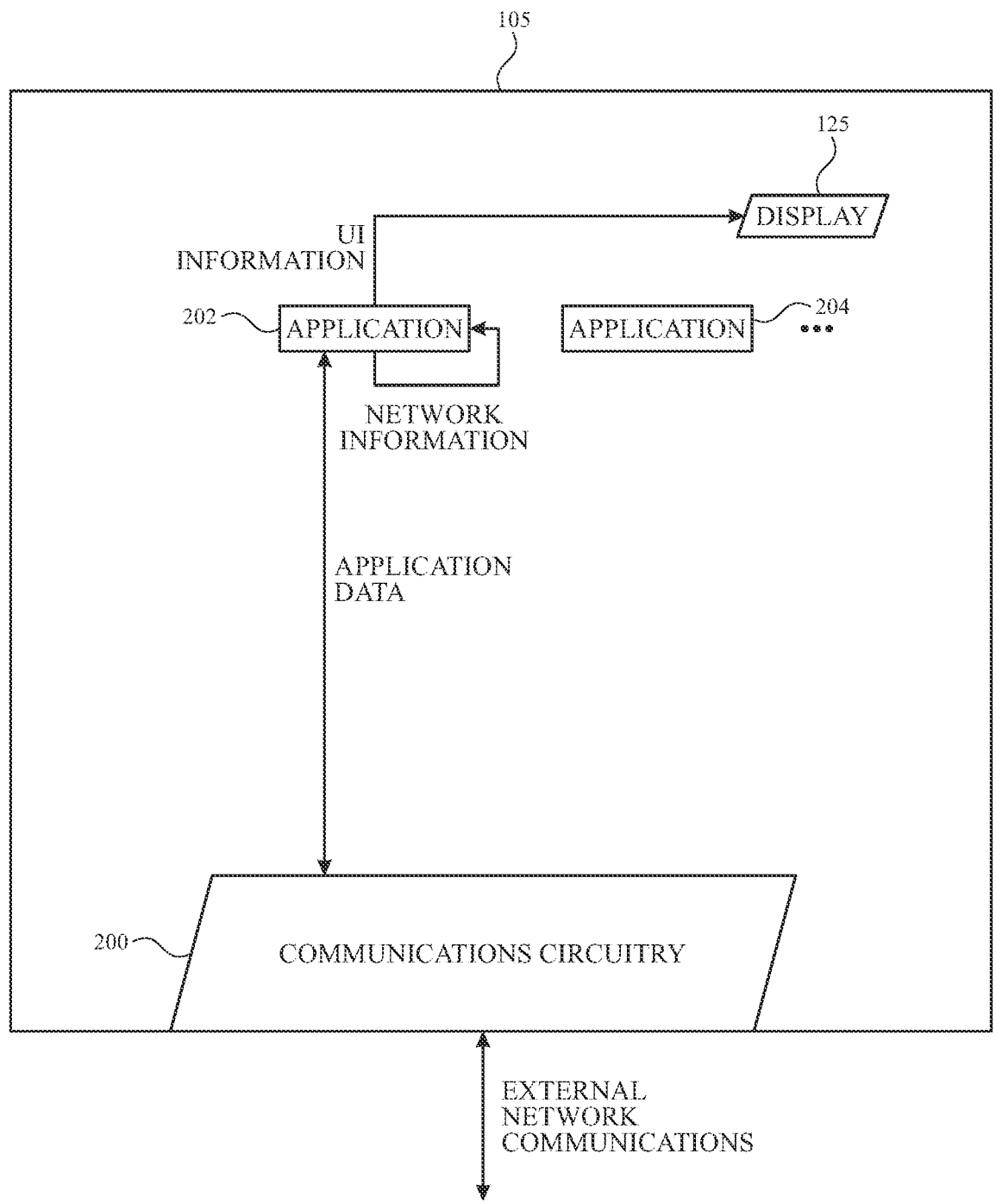
FIG. 2 illustrates an example architecture of an electronic device that may implement aspects of the subject technology in accordance with one or more implementations.

FIG. 2 illustrates an example architecture that may be implemented by the electronic device 105 in accordance with one or more implementations of the subject technology. For explanatory purposes, portions of the architecture of FIG. 2 are described as being implemented by the electronic device 105 of FIG. 1; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. For example, in FIG. 2, the trapezoidal boxes may indicate that the communications circuitry 200 and the display 125 may be hardware components, and the rectangular boxes may indicate that an application 202 and an application 204 may be implemented in software that is executed by one or more processors of the electronic device (e.g., the processor unit(s) 1114 of FIG. 8).

As shown, the application 202 may provide user interface (UI) information to the display 125 of the electronic device 105, for displaying a UI of the application 202. In the example of FIG. 2, the application 202 interacts with the communications circuitry 200 to transmit and/or receive application communications over a network, such as the network 106 of FIG. 1. For example, the application 202 may provide a request (e.g., directly to the communications circuitry, or via an application programming interface (API)) to a system process that manages device communications) to transmit application data from the application 202 over the network 106 (e.g., to a server or another electronic device). The communications circuitry 200 may transmit the application data over the network 106 as external network communications as shown, and/or may receive incoming data for the application in the external network communications. The external network communications may include Wi-Fi communications (e.g., over one more service sets with one or more service set identifiers (SSIDs)) cellular communications, Bluetooth communications, and/or any other wireless network communications (e.g., separately or concurrently). The application 202 may receive the incoming data for the application 202 over the network 106 via the communications circuitry 200. The UI information that is provided to the display 125 may be based, in whole or in part, on the incoming data received via the communications circuitry 200.

In various use cases, the strength of a network signal, a packet loss rate, the rate at which the application 202 can transmit application data over the network 106, and/or the rate at which the application can receive data over the network 106 can vary. As examples, the strength of the network signal, the rate at which the application 202 can transmit application data over the network 106, and/or the rate at which the application can receive data over the network 106 can vary due to changes in the location of the electronic device 105 (e.g., relative to a network node, such as a wireless router), changes to network traffic associated with other devices on the network 106, and/or changes to the amount of data transmitted and/or received by other processes (e.g., other applications and/or system processes) of the electronic device 105.

As shown in FIG. 2, the application 202 may determine, based on application communications (e.g., the data transmitted by the application via the communications circuitry 200 and/or based on the incoming data received at the application 202 via the communications circuitry 200) by the application, network information for the network 106. For example, the network information may include a maximum bit rate that is achievable for the application communications while the electronic device 105 is at a current location of the electronic device 105, and/or at a current time (e.g., a current time of day, or a current day of the week). As another example, the network information may include a network profile that includes one or more of: a wireless signal strength, a packet loss rate, a maximum achievable transmit rate for the application 202, and a maximum achievable receive rate for the application 202. The network information may include network information for a single network over which the application 202 is communicating, and/or network information for multiple networks (e.g., multiple Wi-Fi service sets or multiple networks with multiple different communication protocols, such as Wi-Fi and cellular protocols) over which the application 202 is concurrently communicating and/or has recently communicated.

In one or more implementations, the application 202 may determine an operational mode based on the network information. For example, the application 202 may determine, based on the network information, a frame rate (e.g., in frames per second (fps)) at which to generate frames for transmission to a remote device, and/or a frame rate at which to incorporate frames received from a remote device.

Network information that is obtained by the application 202 may be obtained for the current location of the electronic device 105 and/or may be tracked and/or maintained in connection with a time (e.g., a clock time, such as a time of day, or a calendar time, such as a day of the week). In one or more implementations, the application 202 may also obtain network information at one or more other locations of the electronic device 105. Based on the network information obtained at various locations, the application 202 may, for example, generate a three-dimensional map of the network information (e.g., a three-dimensional wireless signal strength map). In one or more implementations, the application 202 may determine an operational mode of the application based on a location of the electronic device 105 within the three-dimensional map.

In one or more implementations, the application 202 may provide guidance information to guide a user of the electronic device 105 to move the electronic device 105 to a location with improved signal strength relative to the current location of the electronic device 105. For example, the three-dimensional map may be visually overlaid on a view of the physical environment of the electronic device 105 by including the three-dimensional map in the UI information that is provided for display, and the three-dimensional map may indicate (e.g., using color coding or other visually informative information) locations in the physical environment with good signal strength. As another example, the electronic device 105 may overlay, on a view of the physical environment, an arrow that points toward a location in the physical environment with good signal strength, to guide the user to that location. In other examples, the electronic device 105 may provide other visual, audio, and/or other guidance to guide the user to the location with the good signal strength. In one or more implementations, a three-dimensional map of the wireless signal strength and/or quality may be included in the network information that is obtained by the application 202. In one or more implementations, an application can maintain an average, median, or other tracking statistic for a signal metric (e.g., one or more of a wireless signal strength, a packet loss rate, a maximum transmit rate, a maximum receive rate, and/or other signal metric) based on a time of day and/or a day of the week. The application 202 may include the signal metric as a function of time as part of the network information that is obtained by the application 202.

In one or more implementations, the electronic device 105 (e.g., the application 202 or a system process) may use computer vision and/or object detection operations to detect objects in the physical environment of the electronic device 105 that may inhibit or otherwise degrade the wireless signal strength and/or quality that is available to the electronic device 105. For example, the electronic device 105 may detect (e.g., using camera(s) 150 and/or sensor(s) 152) a wireless router, and an object that has been placed near (e.g., in front of) the wireless router and that inhibits or otherwise degrades the wireless signal being provided by the wireless router. In one or more implementations, the electronic device 105 (e.g., the application 202 or a system process) may provide an output that guides a user of the electronic device 105 to move or remove the inhibiting object to improve the signal strength and/or quality that is available to the electronic device 105. In one or more implementations, inhibiting-object information and/or a location of a wireless router may be included in the network information that is obtained by the application 202.

Figure 3:
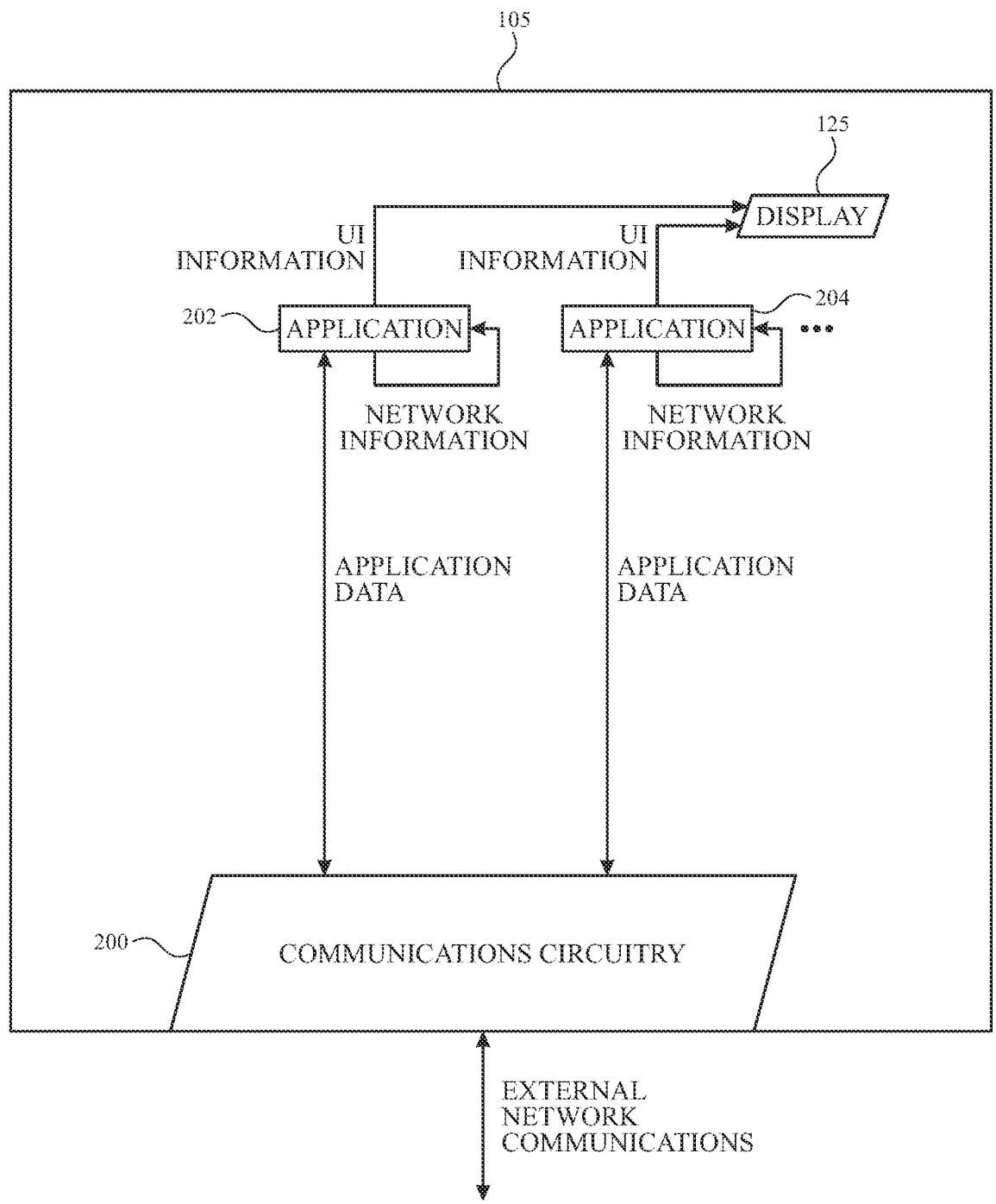
FIG. 3 illustrates an example of an electronic device operating without inter-application network profiles in accordance with one or more implementations.

As shown in FIG. 3, in some implementations, each of multiple applications can determine its own network information. For example, the application 202 and the application 204 can each determine its own network information, and can then determine its own operational mode based on its own network information. Applications can determine their own network information concurrently, as in the example of FIG. 3, or can determine their own network information at different times (e.g., each time an application is launched or returns to an active mode from a background or other inactive mode). However, in either case, redundantly determining the network information by each application in this way can be an inefficient use of application, device, and/or network resources (e.g., including network bandwidth, processor cycles, and/or power resources).

Figure 4:
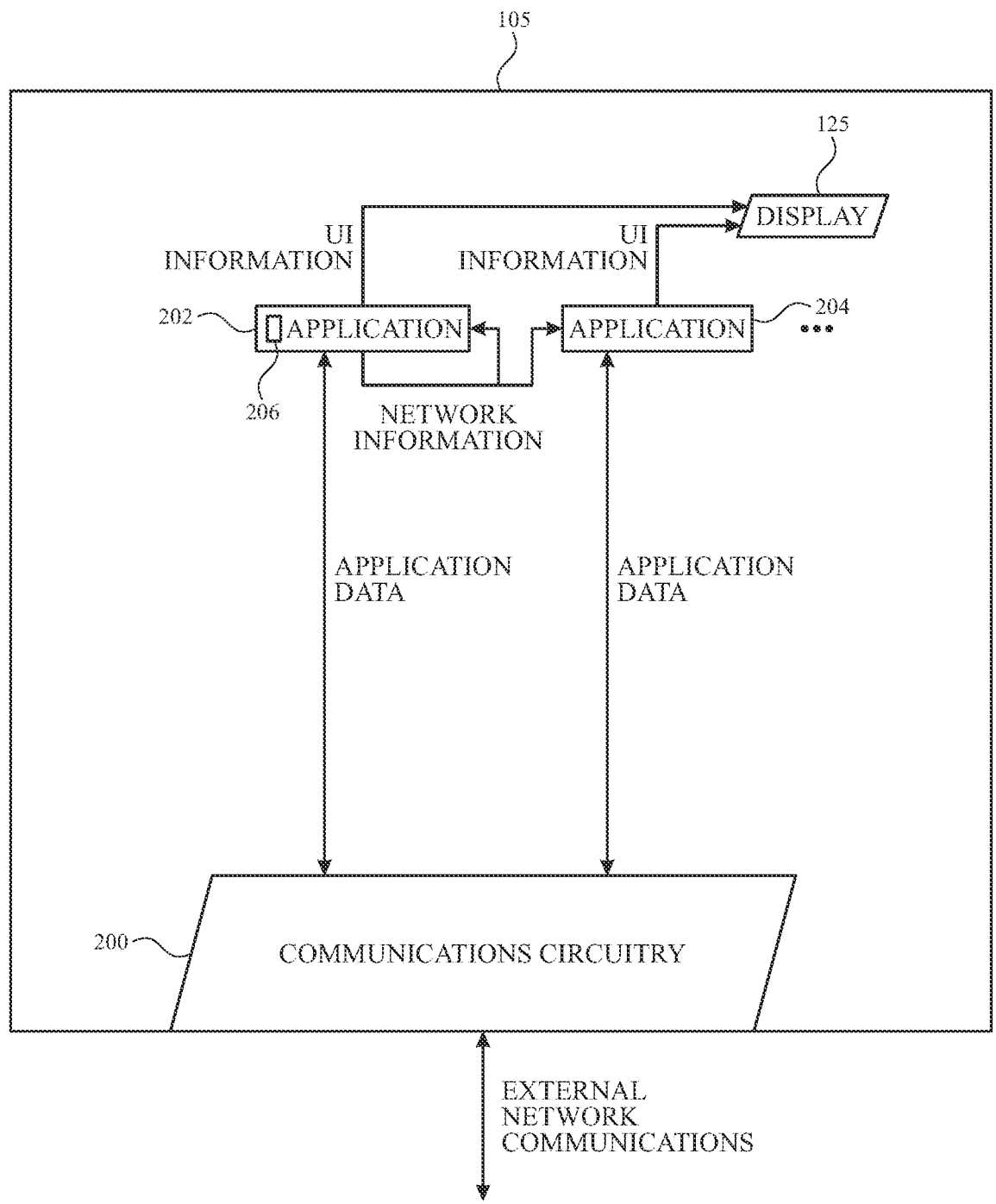
FIG. 4 illustrates an example of an electronic device operating to provide inter-application network profiles in accordance with one or more implementations.

Aspects of the subject technology provide for inter-application network profiles. Inter-application network profiles can help, for example, to improve the efficiency of an electronic device by reducing or preventing redundant network profiling by multiple different applications. For example, FIG. 4 illustrates the electronic device 105 in a use case in which the application 202 generates network information for its own use (e.g., as described herein in connection with FIG. 2), and also provides the network information to the application 204. As shown in the example of FIG. 4, the application 202 may provide the network information directly to the application 204 (e.g., in contrast with both applications receiving network information from the operating system). For example, the network information may be determined by the application 202 and stored in a memory space 206 of the application 202, such that the network information can be provided directly to the application 204 via an inter-process communication (IPC). Providing the network information directly between applications in this way can be beneficial, as, for example, the applications that utilize the network connection may (i) generate more recent and/or more relevant network information for other applications than is available from the operating system (e.g., an operating system may determine a network signal strength, but may not determine a current upload or download data rate that is available to the application(s)), and/or (ii) the application that is utilizing the network connection at any given time may be able to determine the network information based on its own communications without using additional bandwidth and/or other processing resources to determine the network information (e.g., in contrast with a central system process separately determining network information).

Figure 5:
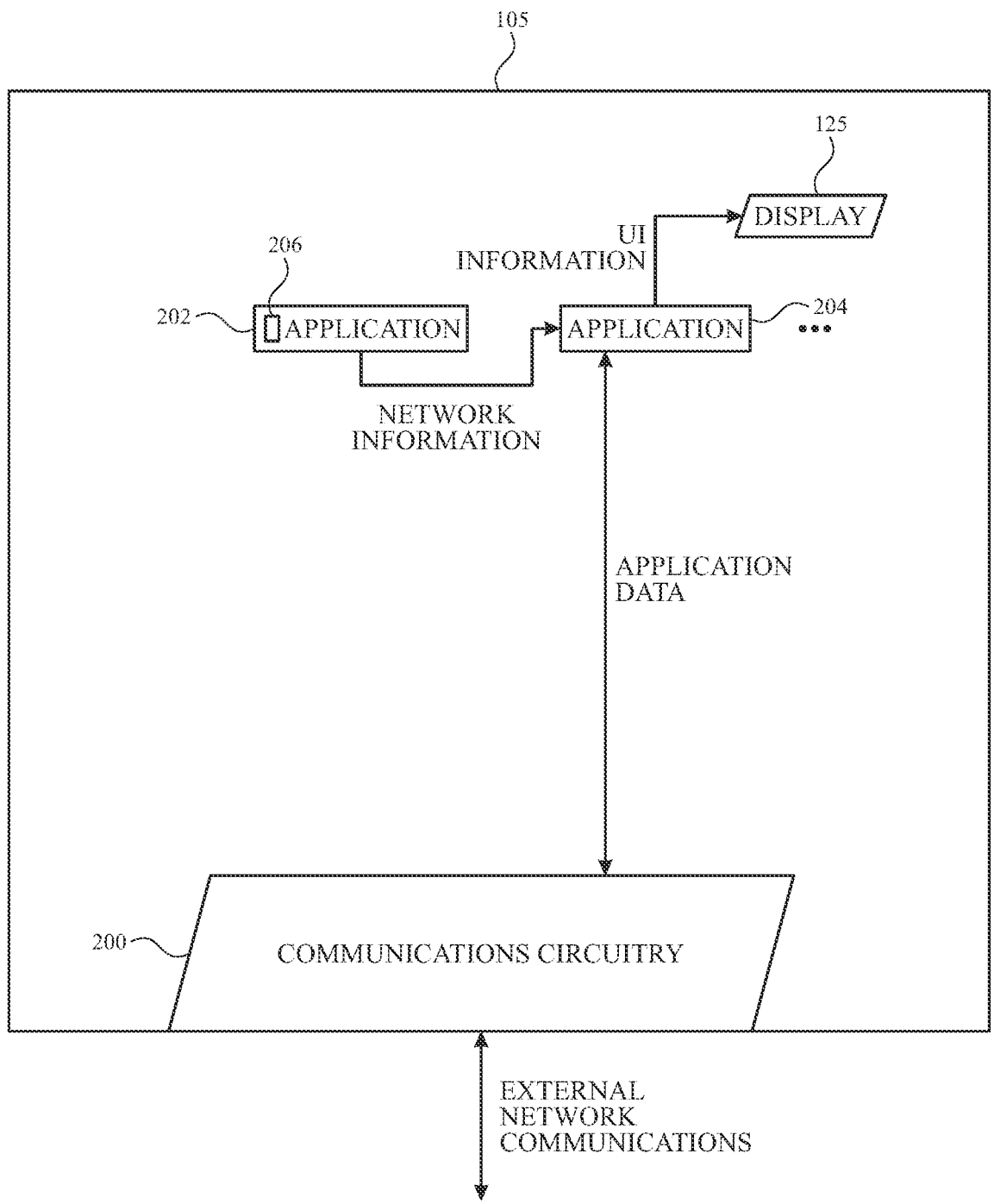
FIG. 5 illustrates another example of an electronic device operating to provide inter-application network profiles in accordance with one or more implementations.

In the example of FIG. 4, the application 202 and the application 204 are concurrently sending and/or receiving data via the communications circuitry 200, and/or concurrently providing UI information to the display 125 for display. FIG. 5 illustrates another example use case in which the application 202 ceases network communications via the communications circuitry 200, and provides the network information to the application 204.

For example, the application 202 may obtain the network information while the application 204 is not communicating via the communications circuitry 200 (e.g., while the application 204 is in an inactive state, such as a background state, as in the example of FIG. 2), write the network information to its own memory space, may then may provide (e.g., via IPC) the network information to the application 204 prior to the application 204 initiating network communications via the communications circuitry 200. For example, the application 202 may provide the network information to the application 204 when the application 204 enters an active state (e.g., by being launched by a user, or called to the foreground if in a background state).

In this way, the application 204 may be provided with the ability to select an operational mode of the application (e.g., a high resolution mode, such as a 1080p more or a 4K mode, or a relatively lower frame rate mode, such as high definition (720p) mode or standard definition (480p) mode) and/or a data rate (e.g., a high frame rate, such as a 60 fps mode, a 120 fps mode, or a 240 fps mode, or a relatively lower frame rate mode, such as a 30 fps mode or a 24 fps mode) that is compatible with (e.g., achievable according to) the network information, before initiating network communications. In this way, the application 204 can efficiently utilize previously determined network information, and/or can provide a more seamless output (e.g., by avoiding initially attempting a high resolution and/or high frame rate mode that is not supported by the network conditions, and/or avoiding initially using a low resolution and/or low frame rate mode when the network conditions support a more data-intensive mode). For example, by starting the application 204 in the mode that is compatible with the current network profile, switching between modes can be reduced, with can provide a more seamless user experience.

In various implementations, the network information that is provided from the application 202 to the application 204 can include all, or a portion, of the network information that is determined by the application 202. In the examples of FIGS. 4 and 5, the network information is provided directly from the application 202 to the application 204 (e.g., via an inter-process communication with the application 204).

Figure 6:
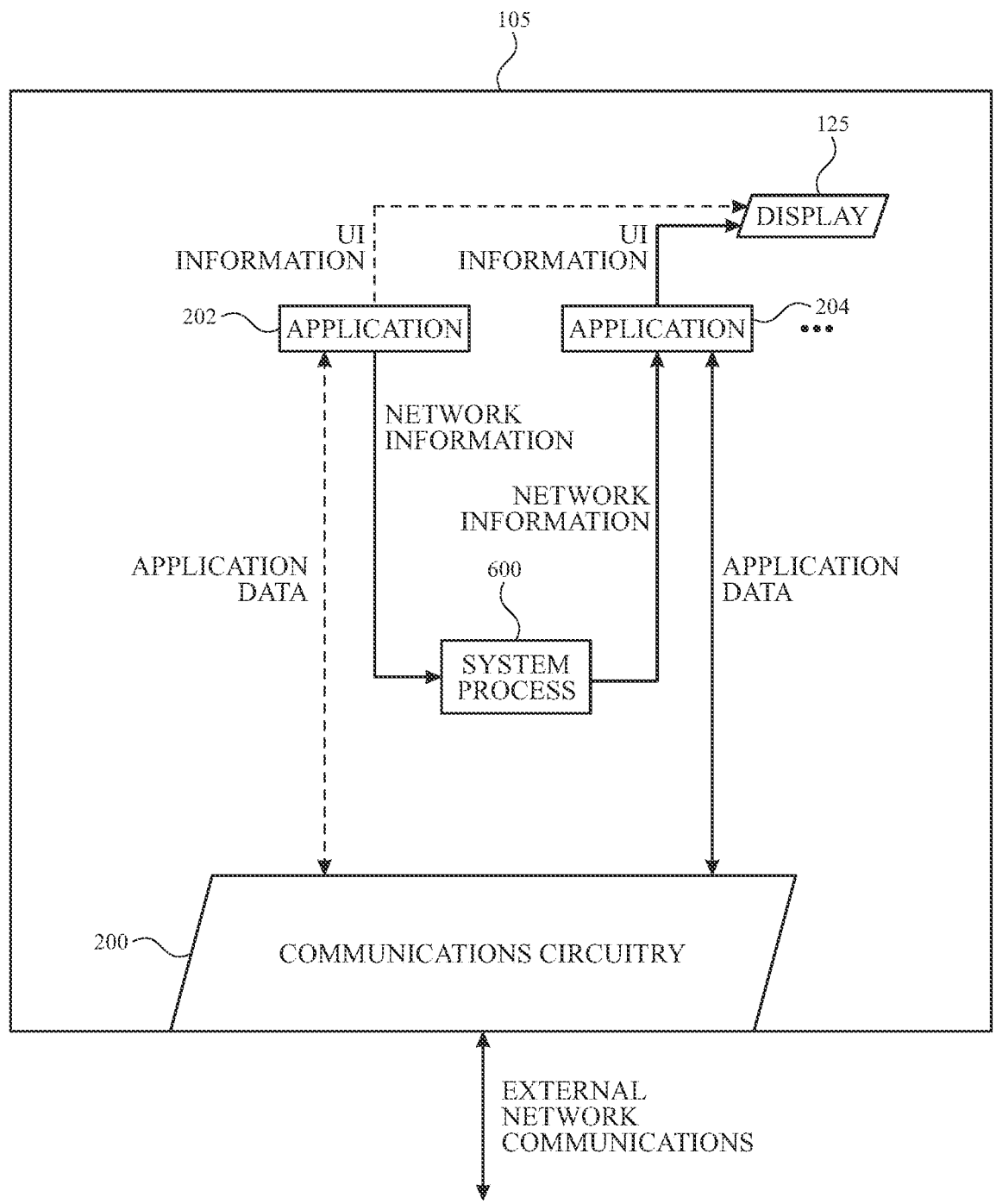
FIG. 6 illustrates an example of an electronic device operating to provide inter-application network profiles via a system process in accordance with one or more implementations.

FIG. 6 illustrates another example implementation, in which the network information is provided from the application 202 to the application 204 via a system process at the electronic device. As shown in FIG. 6, the application 202 may provide the network information to a system process 600. The system process 600 may be an operating system process of an operating system of the electronic device. As shown, the system process 600 may provide the network information to the application 204 (e.g., before or while the application 204 is active and/or communicating via the communications circuitry 200). As illustrated by FIG. 6, the network information may be provided to the system process 600 while the application 202 is active and/or communicating via the communications circuitry 200, or can be provided after or when the application 202 ceases communicating via the communications circuitry 200.

The network information that is provided from the system process 600 may include all of the network information that is received from the application 202, or may include a subset and/or a genericized version of the network information. For example, in one or more implementations, the system process 600 may genericize the network information received from the application 202. For example, the system process 600 may hash a currently achievable bit rate to a semantic metric, such as a "low", "medium", or "high" network quality, and provide the semantic metric to the application 204. In one or more implementations, the network information (e.g., and/or a genericized or hashed version of the network information) can be provided to the application 204 without providing any location information that identifies the current location of the electronic device 105. In this way, an application that receives network information from another application (e.g., via the system process 600) may be prevented from making a detailed map of the signal environment of the electronic device 105 (e.g., which can help protect the privacy of the user of the electronic device 105) in some examples.

In the examples of FIGS. 3-6, two applications are shown, and the application 202 provides network information to the application 204. However, it is appreciated that this is merely illustrative, and more than two applications may concurrently be in various active and/or inactive states at the electronic device 105. The application 202 may provide network information to one or more applications other than the application 204, including applications that run concurrently with the application 202 and/or the application 204, and/or applications that run at different times from the application 202 and/or the application 204.

Although the examples of FIGS. 3-6 depict the network information being obtained by the application 202 and provided to the application 204, in one or more use cases, the application 204 may obtain network information and provide the network information to the application 202 and/or one or more other applications at the electronic device 105. For example, the application 202 may provide network information to the application 204 when the application 204 transitions from an inactive state (e.g., a background state, a minimized state, or a closed state) to an active state. The application 204 may then operate based in part on the network information from the application 202, while the application 202 is in an inactive state. While the application 202 is in the inactive state, the network conditions on the network 106 may change (e.g., due to a change in network traffic on the network 106 and/or a change in the location, position, and/or orientation of the electronic device 105). The application 204 may determine updated network information for the network 106 while the application 202 is in the inactive state, and may provide the updated network information to the application 202 when the application 202 returns to an active state. In one or more use cases, the application 202 may periodically provide updated network information to the application 204 and/or one or more other applications. In one or more use cases, the application 204 may periodically provide updated network information to the application 202 and/or one or more other applications.

In the examples of FIGS. 3-6, network information obtained by an application at the electronic device 105 is provided to another application at the electronic device 105. However, it is also appreciated that the network information obtained by an application at the electronic device 105 may be provided to one or more other electronic devices, such as the electronic device 104 or the electronic device 110 of figure one.

Figure 7:
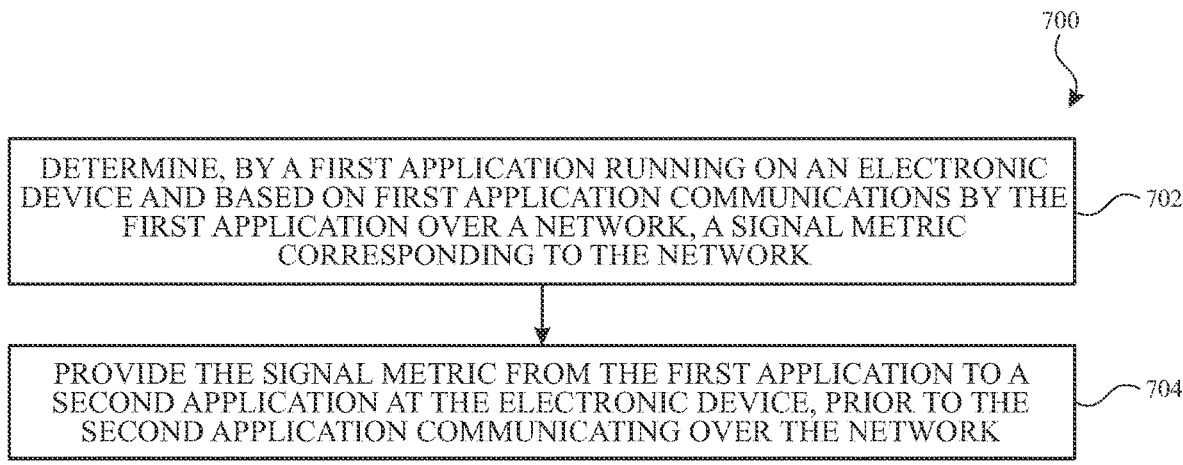
FIG. 7 illustrates a flow diagram of an example process for providing inter-application network profiles according to aspects of the subject technology.

FIG. 7 illustrates a flow diagram of an example process for providing inter-application network profiles according to aspects of the subject technology. For explanatory purposes, the process 700 is primarily described herein with reference to the electronic device 105 of FIG. 1. However, the process 700 is not limited to the electronic device of FIG. 1, and one or more blocks (or operations) of the process 700 may be performed by one or more other components of other suitable devices, including the electronic device 115, and/or the servers 120. Further for explanatory purposes, the blocks of process 700 are described herein as occurring in serial, or linearly. However, multiple blocks of process 700 may occur in parallel. In addition, the blocks of process 700 need not be performed in the order shown and/or one or more blocks of process 700 need not be performed and/or can be replaced by other operations.

In the example of FIG. 7, at block 702, a first application (e.g., application 202) running on an electronic device (e.g., electronic device 105) may determine, based on first application communications by the first application over a network (e.g., network 106), a signal metric corresponding to the network. As an example, the signal metric may include a maximum bit rate that is achievable while the electronic device is at a current location of the electronic device. As another example, the signal metric may include a network profile that includes one or more of: a wireless signal strength, a packet loss rate, a maximum transmit rate (e.g., a maximum transmit bit rate that is achievable while the electronic device is at a current location of the electronic device and/or at the current time), or a maximum receive rate (e.g., a maximum receive bit rate that is achievable while the electronic device is at a current location of the electronic device and/or at the current time).

At block 704, the first application may provide the signal metric from the first application to a second application (e.g., application 204) at the electronic device, prior to the second application communicating over the network.

Figure 8:
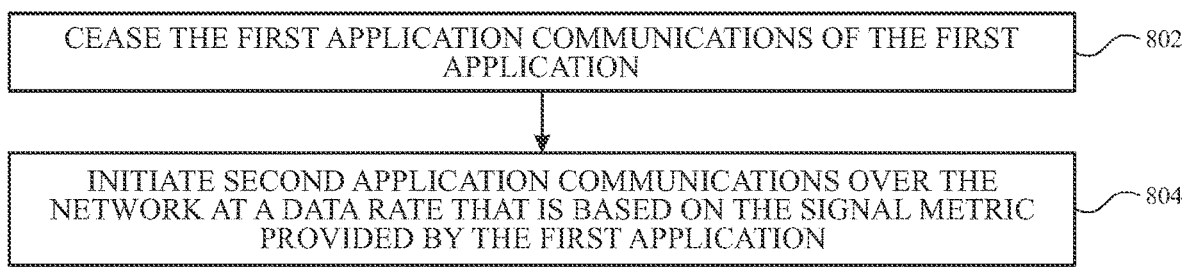
FIG. 8 illustrates a flow diagram of additional aspects of an example process for providing inter-application network profiles according to aspects of the subject technology.
Figure 9:
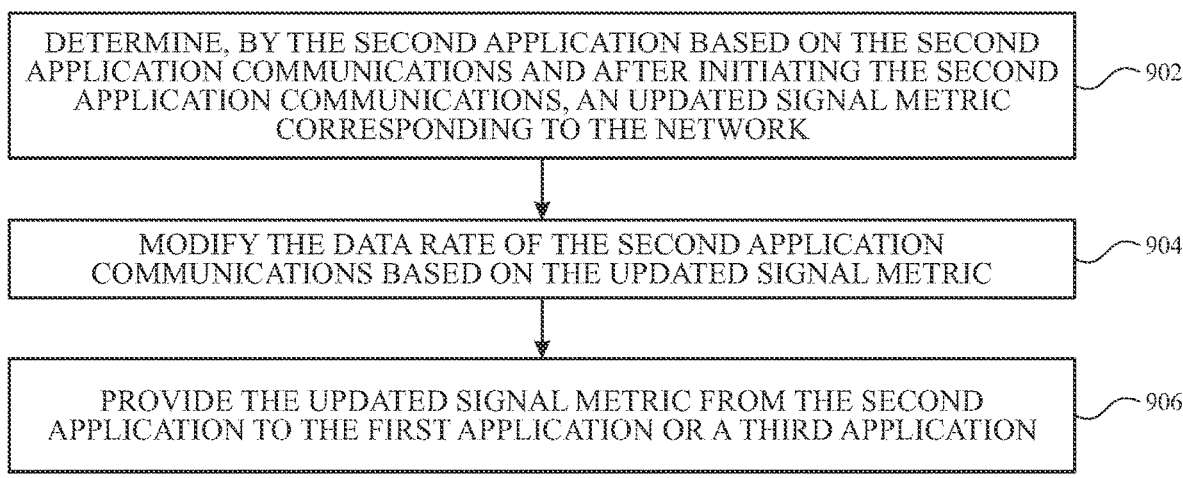
FIG. 9 illustrates a flow diagram of additional aspects of an example process for providing inter-application network profiles according to aspects of the subject technology.
Figure 10:
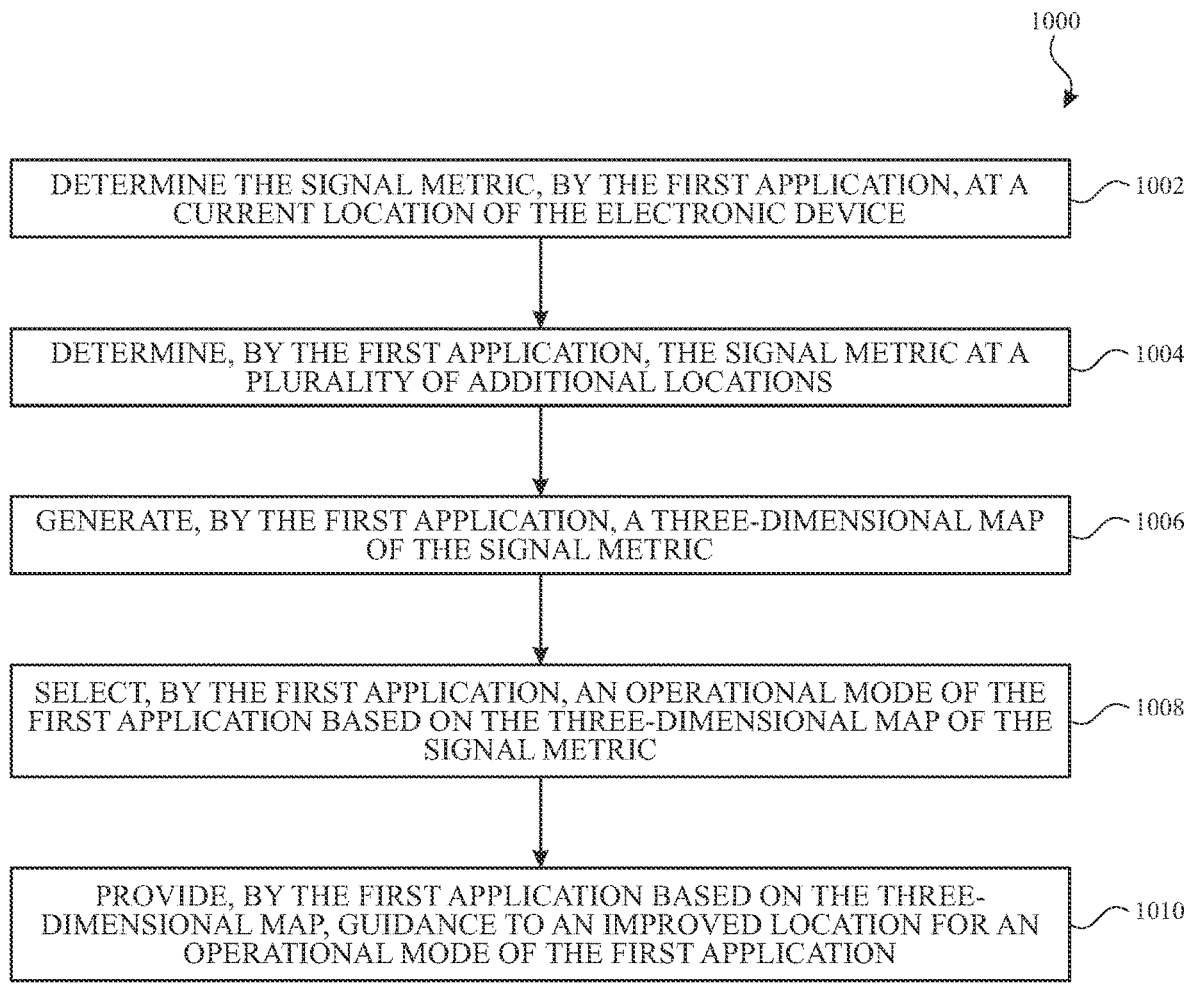
FIG. 10 illustrates a flow diagram of additional aspects of an example process for providing inter-application network profiles according to aspects of the subject technology.

FIGS. 8, 9, and 10 illustrate flow diagrams of additional operations that may be performed for providing inter-application network profiles according to aspects of the subject technology. For explanatory purposes, the processes 800, 900, and 1000 of FIGS. 8, 9, and 10 respectively are primarily described herein with reference to the electronic device 105 of FIG. 1. However, the processes 800, 900, and 1000 of FIGS. 8, 9, and 10 respectively are not limited to the electronic device of FIG. 1, and one or more blocks (or operations) of the processes 800, 900, and/or 1000 may be performed by one or more other components of other suitable devices, including the electronic device 115, and/or the servers 120. Further for explanatory purposes, the blocks of the processes 800, 900, and 1000 are described herein as occurring in serial, or linearly. However, multiple blocks of the processes 800, 900, and/or 1000 may occur in parallel. In addition, the blocks of the processes 800, 900, and/or 1000 need not be performed in the order shown and/or one or more blocks of the processes 800, 900, and/or 1000 need not be performed and/or can be replaced by other operations.

As illustrated in FIG. 8, in one or more use cases, at block 802, the first application may cease communications of the first application (e.g., prior to the initiating of the second application communications by the second application, such as in the example of FIG. 5). In one or more other use cases, initiating the second application communications may include initiating the second application communications concurrently with ongoing first application communications by the first application (e.g., as in the example of FIG. 4). At block 804, the second application may initiate second application communications over the network at a data rate (e.g., a bit rate or a frame rate) that is based on the signal metric provided by the first application (e.g., that is achievable at the current location of the electronic device according to the network information).

In one or more implementations, providing the signal metric from the first application to the second application may include providing the signal metric directly from the first application to the second application. In one or more other implementations, providing the signal metric from the first application to the second application may include providing the signal metric from the first application to a system process (e.g., system process 600), and providing at least a version of the signal metric from the system process to the second application. For example, the version of the signal metric may include the entire signal metric. As another example, the version of the signal metric may include a genericized version of the signal metric, genericized by the system process (e.g., by hashing the signal metric to a genericized version, such as a semantic metric).

In one or more implementations, the process 700 may also include one or more aspects of the process 900 of FIG. 9. As illustrated in FIG. 9, the process 900 may include, at block 902, determining, by the second application based on the second application communications and after initiating the second application communications, an updated signal metric corresponding to the network. At block 904, the second application may modify the data rate of the second application communications based on the updated signal metric. For example, the second application may increase the data rate of application data being generated by the application and/or displayed by the application responsive to updated network information that indicates an improvement in wireless signal strength and/or available bandwidth, or may reduce the data rate of application data being generated by the application and/or displayed by the application responsive to updated network information that indicates a degradation in wireless signal strength and/or available bandwidth. In one or more implementations, at block 906, the second application may provide the updated signal metric from the second application to the first application or a third application (e.g., at the electronic device or another electronic device).

In one or more implementations, the signal metric may also be provided to an application at another electronic device (e.g., the electronic device 104 or the electronic device 105). For example, the other electronic device may be at substantially the same location (e.g., within a few inches or feet) as the electronic device. In one or more implementations, the signal metric may be determined, in part, based on network information received from another electronic device (e.g., another electronic device with which the first application is in communication over the network).

In one or more implementations, the process 700 may also include one or more aspects of the process 1000 of FIG. 10. As illustrated in FIG. 10, in one or more implementations, the process 1000 may include, at block 1002, determining the signal metric by determining the signal metric, by the first application, at a current location of the electronic device. In one or more implementations, at block 1004, the process 1000 may also include determining, by the first application, the signal metric at a plurality of additional locations; and, at block 1006, generating, by the first application, a three-dimensional map of the signal metric. In one or more implementations, the three-dimensional map may be provided to the second application. In one or more implementations, object detection information (e.g., including a location of a wireless router and/or a location of a signal-inhibiting object) obtained by the first application may be provided to the second application.

In one or more implementations, at block 1008, the first application may select an operational mode of the first application based on the three-dimensional map of the signal metric. In one or more implementations, at block 1010, the first application may provide, based on the three-dimensional map, guidance (e.g., using a display or other output component of the electronic device) to an improved location for an operational mode (e.g., the current operational mode or a higher performance operational mode) of the first application.

As described above, one aspect of the present technology is the gathering and use of data available from specific and legitimate sources for providing inter-application network profiles. The present disclosure contemplates that in some instances, this gathered data may include personal information data that uniquely identifies or can be used to identify a specific person. Such personal information data can include audio data, voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing inter-application network profiles.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of providing inter-application network profiles, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
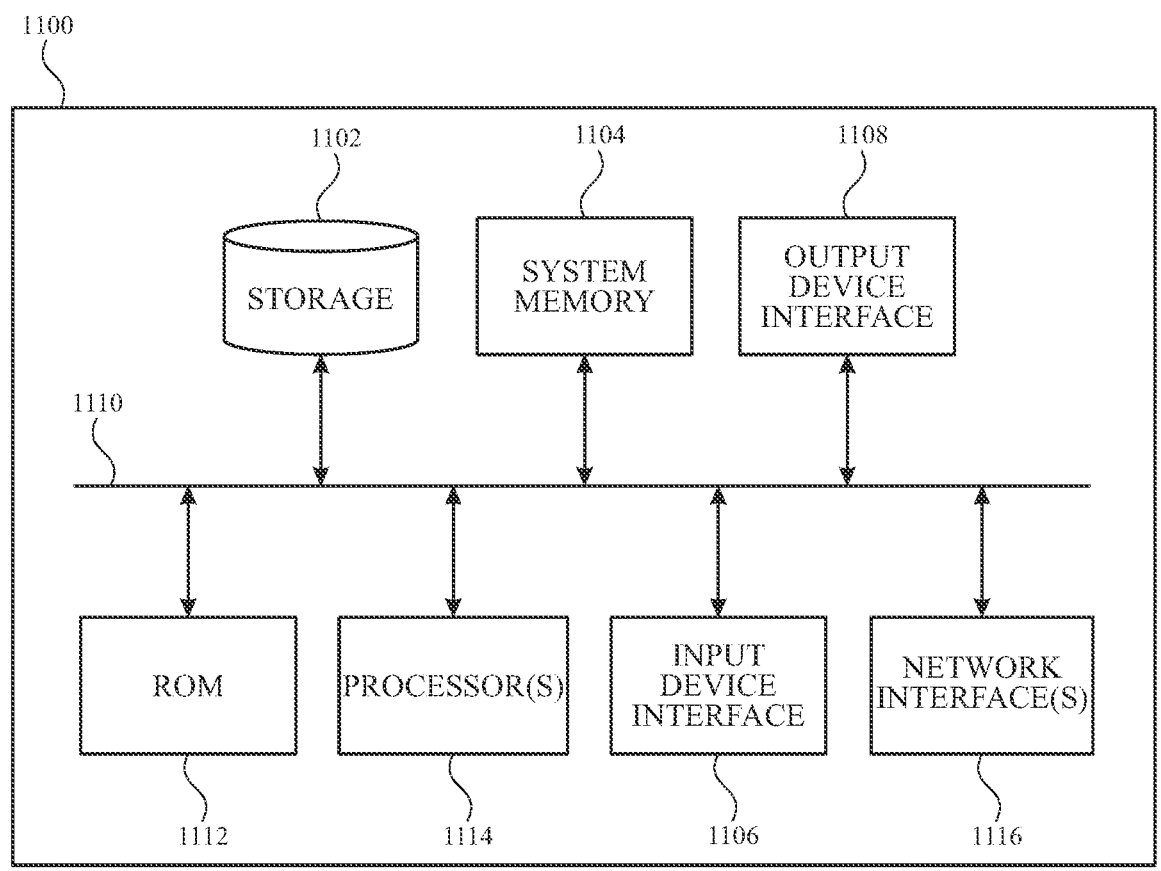
FIG. 11 illustrates an example computing device with which aspects of the subject technology may be implemented.

FIG. 11 illustrates an example computing device with which aspects of the subject technology may be implemented in accordance with one or more implementations.

The computing device 1100 can be, and/or can be a part of, any computing device or server for generating the features and processes described above, including but not limited to a laptop computer, a smartphone, a tablet device, a wearable device such as a goggles or glasses, and the like. The computing device 1100 may include various types of computer readable media and interfaces for various other types of computer readable media. The computing device 1100 includes a permanent storage device 1102, a system memory 1104 (and/or buffer), an input device interface 1106, an output device interface 1108, a bus 1110, a ROM 1112, one or more processing unit(s) 1114, one or more network interface(s) 1116, and/or subsets and variations thereof.

The bus 1110 collectively represents all system, peripheral, and chipset buses that communicatively connect the numerous internal devices of the computing device 1100. In one or more implementations, the bus 1110 communicatively connects the one or more processing unit(s) 1114 with the ROM 1112, the system memory 1104, and the permanent storage device 1102. From these various memory units, the one or more processing unit(s) 1114 retrieves instructions to execute and data to process in order to execute the processes of the subject disclosure. The one or more processing unit(s) 1114 can be a single processor or a multi-core processor in different implementations.

The ROM 1112 stores static data and instructions that are needed by the one or more processing unit(s) 1114 and other modules of the computing device 1100. The permanent storage device 1102, on the other hand, may be a read-and-write memory device. The permanent storage device 1102 may be a non-volatile memory unit that stores instructions and data even when the computing device 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1114 may need at runtime. In one or more implementations, the processes of the subject disclosure are stored in the system memory 1104, the permanent storage device 1102, and/or the ROM 1112. From these various memory units, the one or more processing unit(s) 1114 retrieves instructions to execute and data to process in order to execute the processes of one or more implementations.

The bus 1110 also connects to the input and output device interfaces 1106 and 1108. The input device interface 1106 enables a user to communicate information and select commands to the computing device 1100. Input devices that may be used with the input device interface 1106 may include, for example, alphanumeric keyboards and pointing devices (also called "cursor control devices"). The output device interface 1108 may enable, for example, the display of images generated by computing device 1100. Output devices that may be used with the output device interface 1108 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1110 also couples the computing device 1100 to one or more networks and/or to one or more network nodes through the one or more network interface(s) 1116. In this manner, the computing device 1100 can be a part of a network of computers (such as a LAN, a wide area network ("WAN"), or an Intranet, or a network of networks, such as the Internet. Any or all components of the computing device 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by a first application running on an electronic device and based on first application communications by the first application over a network, a signal metric corresponding to the network; and
   providing the signal metric from the first application to a second application at the electronic device, prior to the second application communicating over the network.

2. The method of claim 1, further comprising, with the second application, initiating second application communications over the network at a data rate that is based on the signal metric provided by the first application.

3. The method of claim 2, further comprising ceasing the first application communications of the first application prior to initiating the second application communications by the second application.

4. The method of claim 2, wherein initiating the second application communications comprises initiating the second application communications concurrently with ongoing first application communications by the first application.

5. The method of claim 2, further comprising determining, by the second application based on the second application communications and after initiating the second application communications, an updated signal metric corresponding to the network.

6. The method of claim 5, further comprising modifying the data rate of the second application communications based on the updated signal metric.

7. The method of claim 6, further comprising providing the updated signal metric from the second application to the first application or a third application.

8. The method of claim 1, wherein providing the signal metric from the first application to the second application comprises providing the signal metric directly from the first application to the second application.

9. The method of claim 1, wherein providing the signal metric from the first application to the second application comprises providing the signal metric from the first application to a system process, and providing at least a version of the signal metric from the system process to the second application.

10. The method of claim 9, wherein the version of the signal metric comprises a genericized version of the signal metric, genericized by the system process.

11. The method of claim 1, wherein the signal metric comprises a maximum bit rate that is achievable while the electronic device is at a current location of the electronic device.

12. The method of claim 1, wherein providing the signal metric comprises providing a network profile that includes one or more of: a wireless signal strength, a packet loss rate, a maximum transmit rate, and a maximum receive rate.

13. The method of claim 1, further comprising providing, by the first application, the signal metric to an application at another electronic device.

14. The method of claim 1, wherein determining the signal metric comprises determining the signal metric, by the first application, at a current location of the electronic device, the method further comprising:

determining, by the first application, the signal metric at a plurality of additional locations; and generating, by the first application, a three-dimensional map of the signal metric.

15. The method of claim 14, further comprising:

selecting, by the first application, an operational mode of the first application based on the three-dimensional map of the signal metric.

16. The method of claim 14, further comprising:

providing, by the first application based on the three-dimensional map, guidance to an improved location for an operational mode of the first application.

17. A device, comprising:

a memory; and one or more processors configured to:

determine, by a first application running on the device and based on first application communications by the first application over a network, a signal metric corresponding to the network; and provide the signal metric from the first application to a second application at the device, prior to the second application communicating over the network.

18. The device of claim 17, wherein the one or more processors are further configured to:

with the second application, initiate second application communications over the network at a data rate that is based on the signal metric provided by the first application.

19. The device of claim 17, wherein the signal metric comprises a maximum bit rate that is achievable while the device is at a current location of the device.

20. A non-transitory computer-readable medium storing instructions which, when executed by one or more processors, cause the one or more processors to:

determine, by a first application running on a device and based on first application communications by the first application over a network, a signal metric corresponding to the network; and provide the signal metric from the first application to a second application at the device, prior to the second application communicating over the network.

* * * * *